United States Patent [19]

Hurd

[11] 4,372,000
[45] Feb. 8, 1983

[54] BEEHIVE FRAME AND METHOD OF CONSTRUCTION THEREOF

[76] Inventor: Edford N. Hurd, R.D. 1, Pennelville, N.Y. 13132

[21] Appl. No.: 232,471

[22] Filed: Feb. 9, 1981

[51] Int. Cl.³ .............................................. A01K 47/02
[52] U.S. Cl. ......................................................... 6/10
[58] Field of Search ..................................... 6/10, 11

[56] References Cited

U.S. PATENT DOCUMENTS 4,185,343  1/1980  Ross ........................................ 6/10

FOREIGN PATENT DOCUMENTS 71244   7/1942   Czechoslovakia ....................... 6/10
2298945 8/1976   France .................................... 6/10
460616  2/1937   United Kingdom .................... 6/10
644507  10/1950  United Kingdom .................... 6/10

Primary Examiner—Gene Mancene
Assistant Examiner—Robert P. Swiatek
Attorney, Agent, or Firm—Charles S. McGuire

[57] ABSTRACT

A beehive frame comprising two congruent pieces of molded plastic each having a plurality of openings therein of equal size and shape. The two members are placed in facing relation with the openings in registration and a sheet of comb foundation, such as natural beeswax, supported between the openings. The two pieces are of molded plastic, preferably an expanded polystyrene, and are formed by cutting a unitary plastic part lengthwise with a hot wire. The frame normally includes a plurality of openings for the construction of combs, each surrounded by structure which may be cut from the remainder of the frame as desired to provide one or more individual honeycombs. The plastic is preferably of a brown shade for esthetic purposes so that "travel marks" made by the bees upon the frame surrounding the combs are less noticeable. The frames are extremely economical in materials and construction time, being disposable after a single use.

8 Claims, 4 Drawing Figures

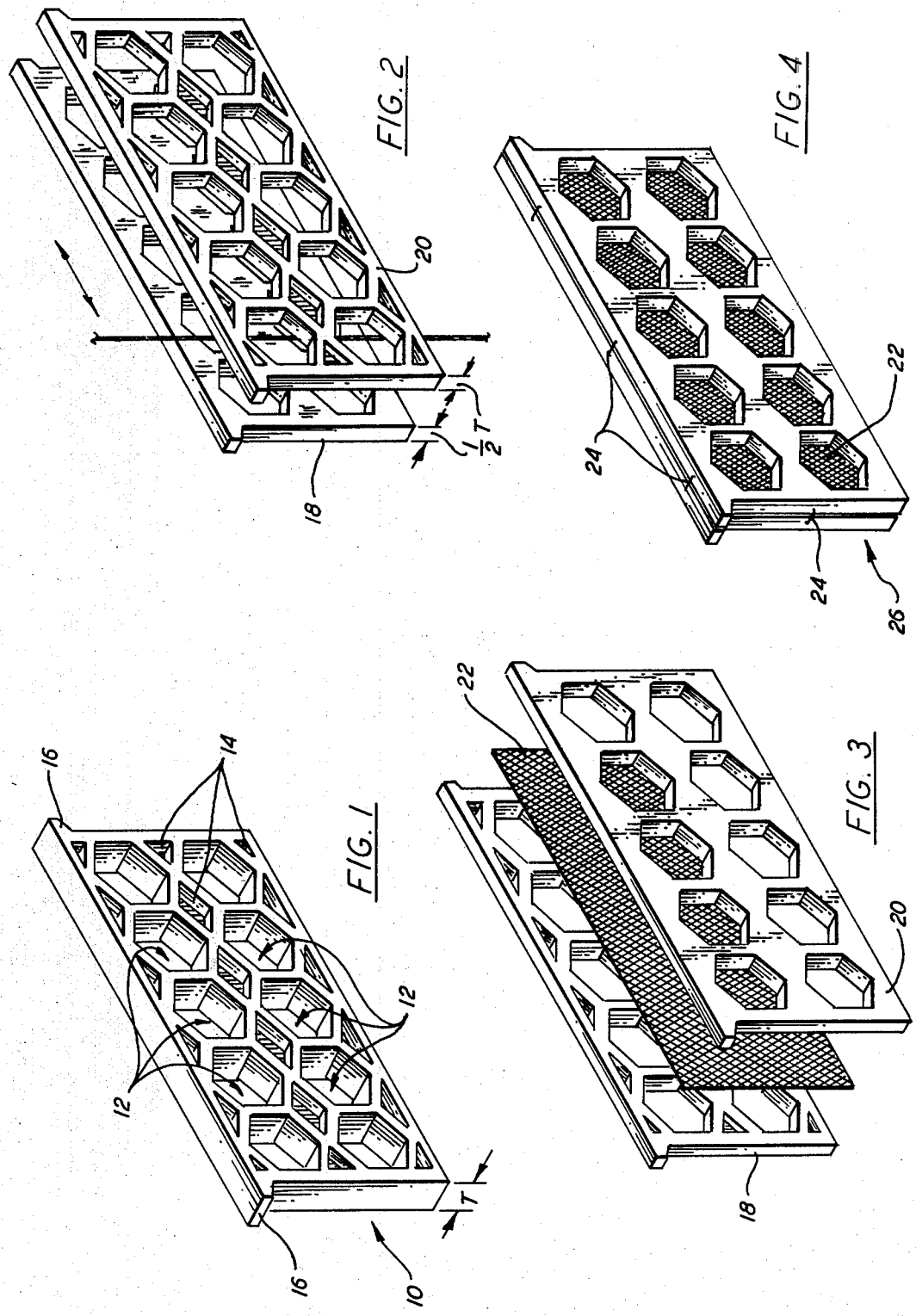

BEEHIVE FRAME AND METHOD OF CONSTRUCTION THEREOF

BACKGROUND OF THE INVENTION

The present invention relates to bee frames used in the production of comb honey and, more particularly, to novel molded plastic frames and methods of construction thereof.

A typical beehive maintained for the domestic consumption of comb honey includes a number of so-called bee frames supported in side-by-side relation within a rectangular box or housing, referred to as a super, two or more such supers normally being stacked upon one another to form the complete hive. The bee frames have traditionally been constructed of wood in an open rectangular configuration, but frames of molded plastic construction have also been proposed. U.S. Pat. Nos. 3,579,676, 2,239,708, 3,088,135, 3,864,196 and 3,885,260, for example, disclose beehive frames and/or comb foundations made partially or completely of molded plastic. The structure of these prior art molded plastic frames is such, however, that expensive molds are required and/or other disadvantages of wooden bee frames remain.

A principal object of the present invention is to provide a beehive frame, and method of construction thereof, which significantly reduce the cost of both labor and materials to the point that the frames are disposable after a single use without significantly affecting the cost of the comb honey contained therein.

A further object is to provide a bee frame which may conveniently be cut into individual pieces after being filled with comb honey to serve as a support for the marketed combs.

Another object is to reduce the cost and/or increase the profit to the producer of comb honey by providing a bee frame which requires minimal assembly time, allows the honey to be sold without cutting the comb, provides the quantity requested by the customer in a single operation, and provides an attractive and ready-made package for the honeycomb.

Other objects will in part be obvious and will in part appear hereinafter.

SUMMARY OF THE INVENTION

In accordance with the foregoing objects, the invention contemplates a beehive frame which is formed as a unitary, monolithic, molded plastic member, preferably of an expanded polystyrene. This provides not only a relatively inexpensive and lightweight material, but also more reasonable tooling costs. Also, although the material is rigid, it has a melting temperature which allows it to be cut to fairly precise shapes with a hot wire or other such simple means.

The bee frame is formed by cutting the plastic member lengthwise to provide two, substantially identical halves. Each frame half is rectangular in outline, and includes a plurality of openings which are preferably hexagonal in shape. A sheet of honeycomb foundation, preferably of natural beeswax, is placed between the two halves which are arranged in congruent relation, as before the unitary member was cut, with the comb foundation covering the registered openings in the two halves at the juncture thereof. The frame halves are then rejoined with the comb foundation supported therebetween and the frame is ready for use. A simple and expedient means of joining the frame halves is with staples which engage adjoining marginal edge portions of the two halves.

BRIEF DESCRIPTION OF THE DRAWINGS

FIG. 1 is a perspective view of a molded plastic member used in construction of the bee frame of the invention;

FIG. 2 is a perspective view of the member of FIG. 1 cut lengthwise into two halves;

FIG. 3 is a perspective view of the two halves of FIG. 2 with the sides reversed and a sheet of comb foundation positioned therebetween; and FIG. 4 is a perspective view of the completed frame, ready for use.

DETAILED DESCRIPTION

Referring now to the drawing, which illustrates both the structure of the bee frame of the invention and the sequence of steps in its construction, in FIG. 1 is shown a member denoted generally by reference numeral 10 which is formed by conventional molding procedures from a suitable plastic such as expanded polystyrene. Member 10 is rectangular in external periphery and includes a plurality of openings 12 extending through, and a plurality of recesses 14 extending a distance into both major surfaces. Member 10 is symmetrical and identical on both sides. Openings 12 are all of the same size and shape, preferably but not necessarily hexagonal to conform to the shape of individual honeycomb cells formed by bees. In the illustrated embodiment, member 10 includes two rows of five openings each, although the number, size and location of the openings may be varied if desired. Recesses 14 are provided to reduce the weight and amount of material used in the frame, but serve no other functional purpose and their presence is entirely optional. An ear 16 projects from each end of one of the long edges of member 10 to rest upon suitable supports in a super of a beehive when the completed frame is in use, as will later become apparent. The thickness of member 10, which is uniform throughout except in the areas of the openings and recesses, is designated as dimension 'T'.

After member 10 is molded in the form described it is cut lengthwise, preferably along its lateral centerline, by any convenient tool such as a saw, knife or hot wire suited to cut the material of which member 10 is formed. As seen in FIG. 2, member 10 has been so cut by a diagrammatically indicated tool moving in the direction of the arrows to form two substantially identical halves, denoted by reference numerals 18 and 20. The depth of recesses 14 on opposite sides of member 10 is shallow enough that sufficient material is present between the recesses to insure that the surfaces formed by the cutting are essentially smooth and there are no breaks which would form unwanted openings communicating with the recesses. Thus, the thickness of portions 18 and 20 is ½T.

After cutting, each of portions 18 and 20 is turned over so that the surfaces containing recesses 14 are facing one another and the smooth surfaces formed by the cutting operation become the outer surfaces. Portions 18 and 20 are shown in FIG. 3 after being turned, and sheet 22 of comb foundation is placed between the two. The comb foundation is a conventional element, having a pattern of hexagonal indentations on each side upon which the bees construct a comb and deposit honey. Both natural (beeswax) and synthetic materials have been used as comb foundations, sheet 22 preferably being of natural beeswax and thus edible together with the comb honey deposited thereon. Sheet 22 is large enough to cover all of openings 12, but need not be as large as the external periphery of member 10. In fact, individual sheets of comb foundation may be provided for each of openings 12, but the resulting savings in material may not offset the additional time and trouble required to place individual sheets in covering relation to each of the openings.

Portions 18 and 20 are brought together with sheet 22 supported therebetween and are rejoined as shown in FIG. 4 to provide the bee frame of the invention in its final form. The completed frame, ready for insertion in a beehive super, is denoted generally by reference numeral 26. Although any desired means of joining frame halves 18 and 20 together may be employed, the preferred joining means is staples which extend between and engage adjoining marginal edge portions of the frame halves, several staples being shown in FIG. 4 and denoted by reference numeral 24.

Bee frame 26 may be constructed from member 10 and sheet 22 in a matter of minutes, as opposed to the long and laborious fabrication required for conventional bee frames, particularly those of wooden construction. A plurality of frames 26 are suspended in vertical planes, in side-by-side relation within an otherwise conventional super, wherein the bees will construct combs and deposit honey upon the foundation of sheet 22 within each of openings 12 on both sides of the frame. Thus, the comb foundation is actually at the center of combs constructed on both sides thereof. When the openings are filled, the entire frame is removed from the super and the individual combs may be removed from the openings, or, preferably, the frame material may be cut (again, with a hot wire, etc.) into individual pieces each including one or more complete combs. It is therefore unnecessary to cut the combs, since portions of the disposable frame may continue to support the combs until they reach the consumer. The frame material is preferably brown in color so that the "travel marks" which are left by the bees when walking on the frame structure are not as evident as they would be on frames which are white, etc.

What is claimed is:

1. The method of constructing a disposable, single use honeycomb frame comprising:
    (a) forming a unitary, molded, light weight, easily cuttable plastic member having a plurality of openings extending therethrough and surrounded on all sides by structure of predetermined thickness;
    (b) cutting said member lengthwise into two pieces of approximately half said predetermined thickness, whereby each piece has a plurality of separated openings therethrough;
    (c) placing a sheet of comb foundation at least as large as the total area of said openings between said two pieces; and
    (d) joining said two pieces to one another with the openings in registration and said sheet covering the inside of each, whereby said frame may be placed in a super for construction of combs and deposit of honey within the openings on each side of said comb foundation and any desired portion of said frame including one or more of the honey-containing openings may be severed from the remainder of said frame.

2. The invention according to claim 1 wherein said plastic is an expanded polystyrene.

3. The invention according to claim 1 wherein said cutting is performed with a hot wire.

4. The invention according to claim 1 wherein the outwardly facing sides of said structure prior to said cutting step are in face-to-face relation when said pieces are joined.

5. The invention according to claim 4 and including the further step of forming recesses extending congruently into opposite surfaces of said member in portions of said structure surrounding said openings, said recesses having a depth less than half said predetermined thickness, whereby sufficient material separates the congruent recesses on said opposite surfaces that upon cutting said member lengthwise, said structure surrounding the openings in each of said two pieces contains said recesses on one side and is essentially flat on the other side, the latter being the outwardly facing sides when said pieces are joined.

6. The invention according to claim 1 wherein said pieces are joined by stapling.

7. The invention according to claim 1 wherein said openings are hexagonal.

8. The invention according to claims 1 or 7 wherein a plurality of said openings are provided in side-by-side relation in each of a plurality of adjacent rows, and including the further step of severing said structure surrounding one or more of said openings, subsequent to the filling thereof with comb honey, to provide a portion of said frame containing at least one honey-containing opening surrounded on all sides by supporting structure.

* * * * *